United States Patent [19]

Mercola et al.

[11] Patent Number: 4,959,833
[45] Date of Patent: Sep. 25, 1990

[54] DATA TRANSMISSION METHOD AND BUS EXTENDER

[75] Inventors: Gerald K. Mercola, Pleasanton; Shih-Hsing Huang, San Jose, both of Calif.

[73] Assignee: ICS Electronics Corporation, San Jose, Calif.

[21] Appl. No.: 321,528

[22] Filed: Mar. 8, 1989

[51] Int. Cl.$^5$ ............................................. G06F 11/08
[52] U.S. Cl. .................................................... 371/32
[58] Field of Search ..................... 371/32, 33, 35, 20.1, 371/20.2, 20.6; 370/13, 94.1, 85.1, 85.13, 85.9

[56] References Cited

U.S. PATENT DOCUMENTS

| | | | |
|---|---|---|---|
| 3,979,719 | 9/1976 | Tooley | 371/32 |
| 4,479,228 | 10/1984 | Crane | 375/7 |
| 4,577,317 | 5/1986 | Chu et al. | 370/110.1 |
| 4,787,029 | 11/1988 | Khan | 364/200 |

OTHER PUBLICATIONS

ICS Electronics Corp., "Building Blocks from ICS . . . ", n.d., pp. 2–5, 21–36.

Primary Examiner—Jerry Smith
Assistant Examiner—Robert W. Beausoliel
Attorney, Agent, or Firm—Thomas Schneck

[57] ABSTRACT

A bus extender and data transmission method in which a continuous train of message frames of fixed size is sent along a dual serial link in both directions simultaneously. There is no handshaking between extenders unless a transmission error is detected. Message frames are constructed at a rate which is independent of serial link length and the bus data transfer rate. Each extender is divided into a bus handshake layer which sends and receives data and signals from a local bus, a management layer which continuously constructs message frames, responds to commands and receives and decodes incoming messages from a remote extender, and a transport layer. The transport layer has shift registers and encoders to receive messages from the management layer and transmit them over the serial link and has a memory to store up to 30 messages in the event of a retransmission request. The transport layer also receives messages from the serial link, checks for valid error-free messages and sends them to the management layer. It also initiates a retransmission request in the event a transmission error is detected.

11 Claims, 6 Drawing Sheets

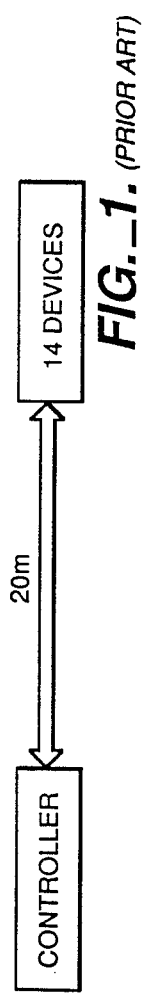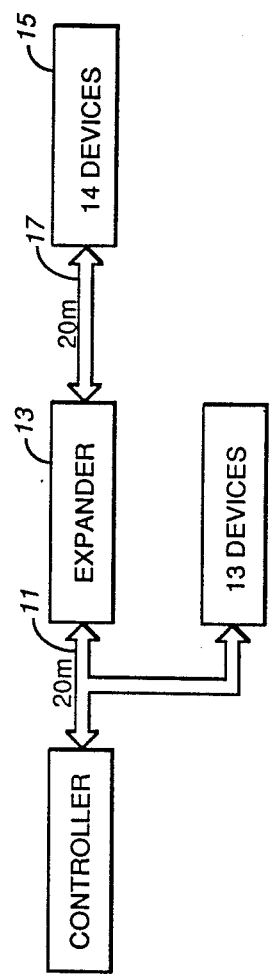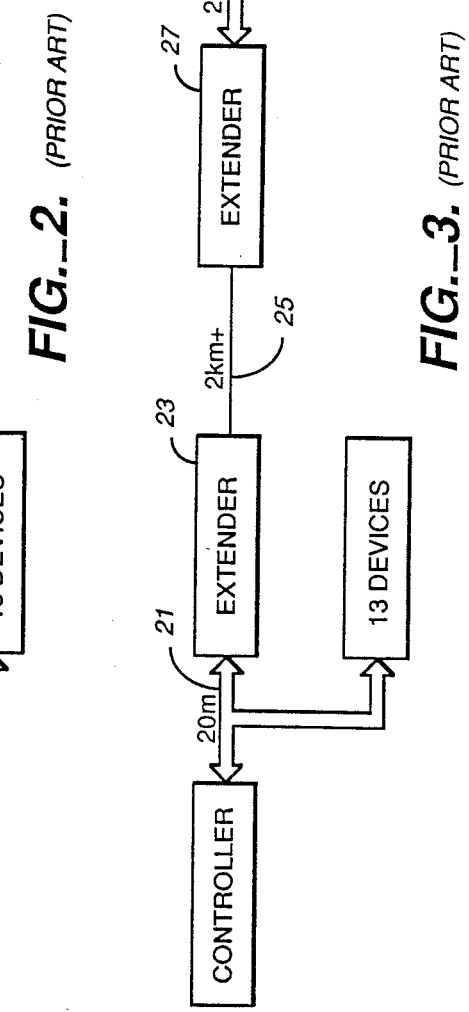

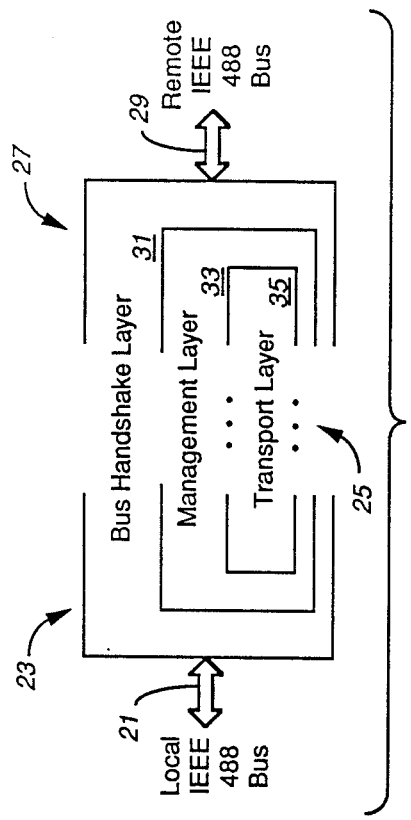
FIG._4.
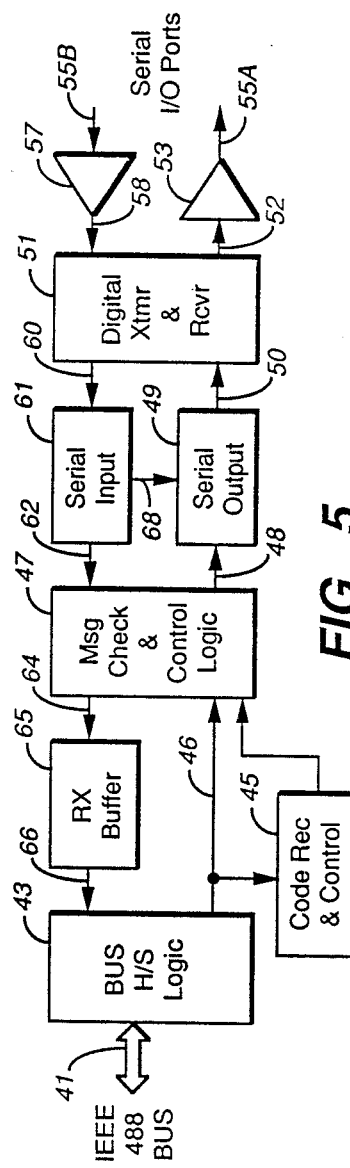
FIG._5.

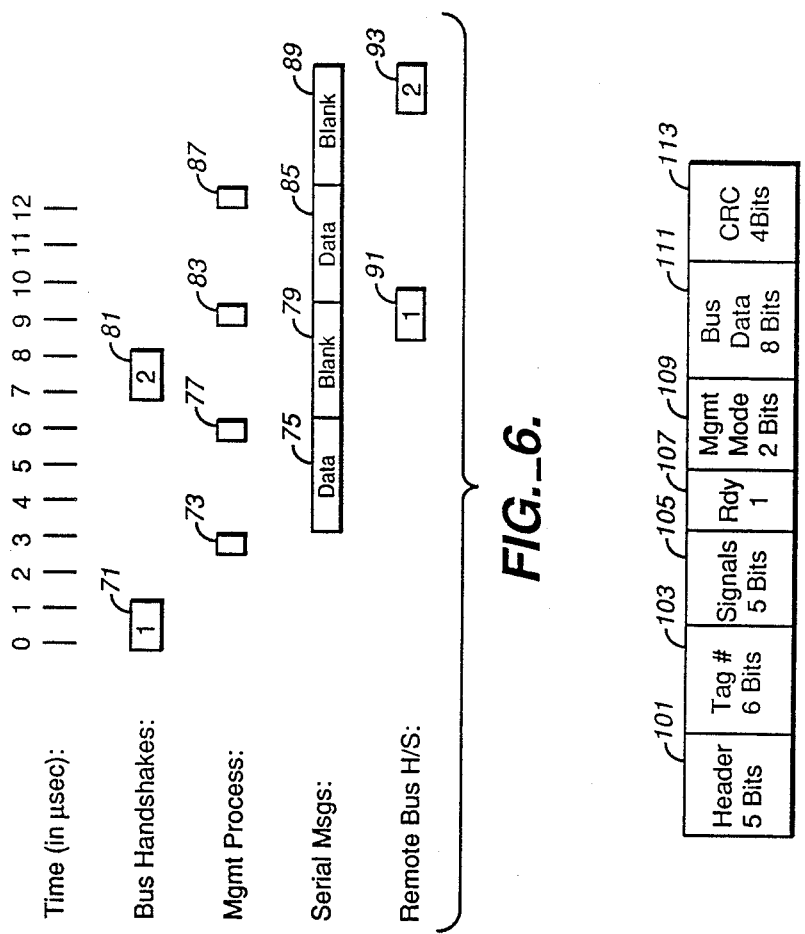

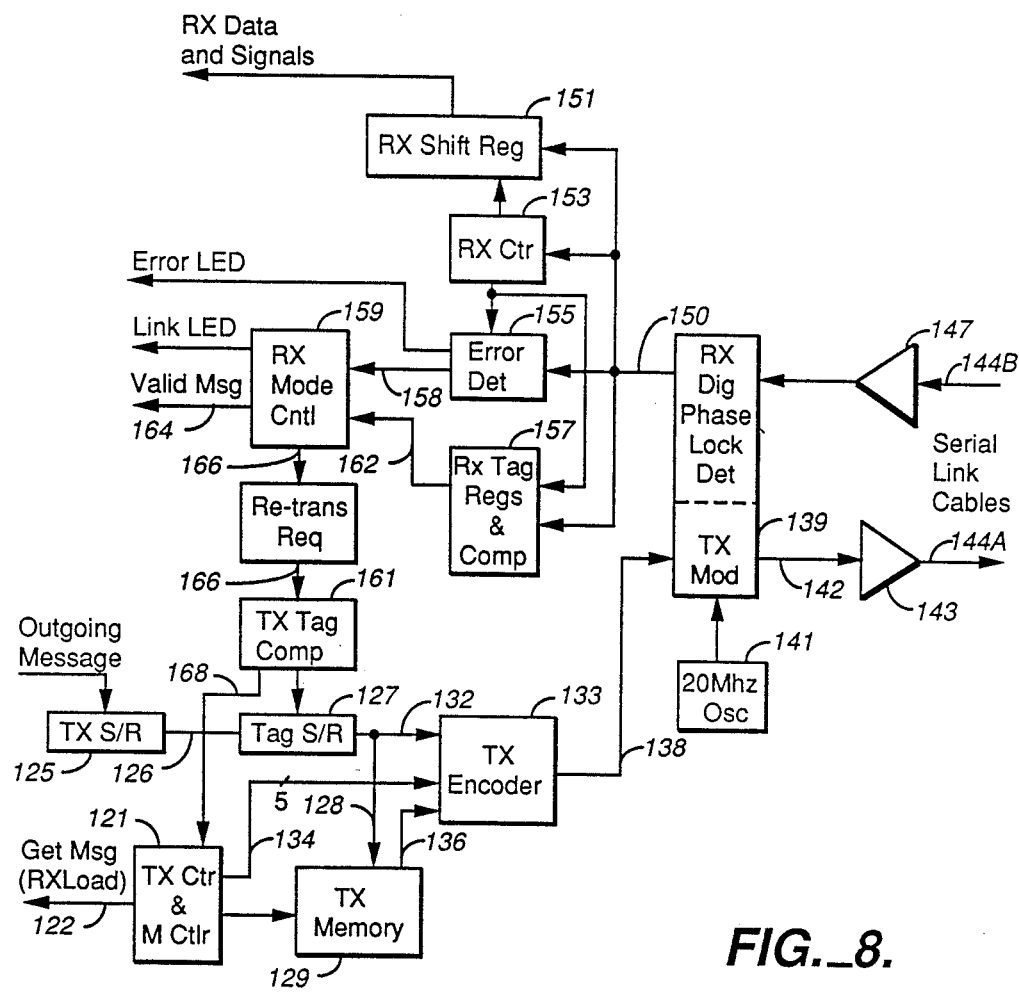
FIG._8.

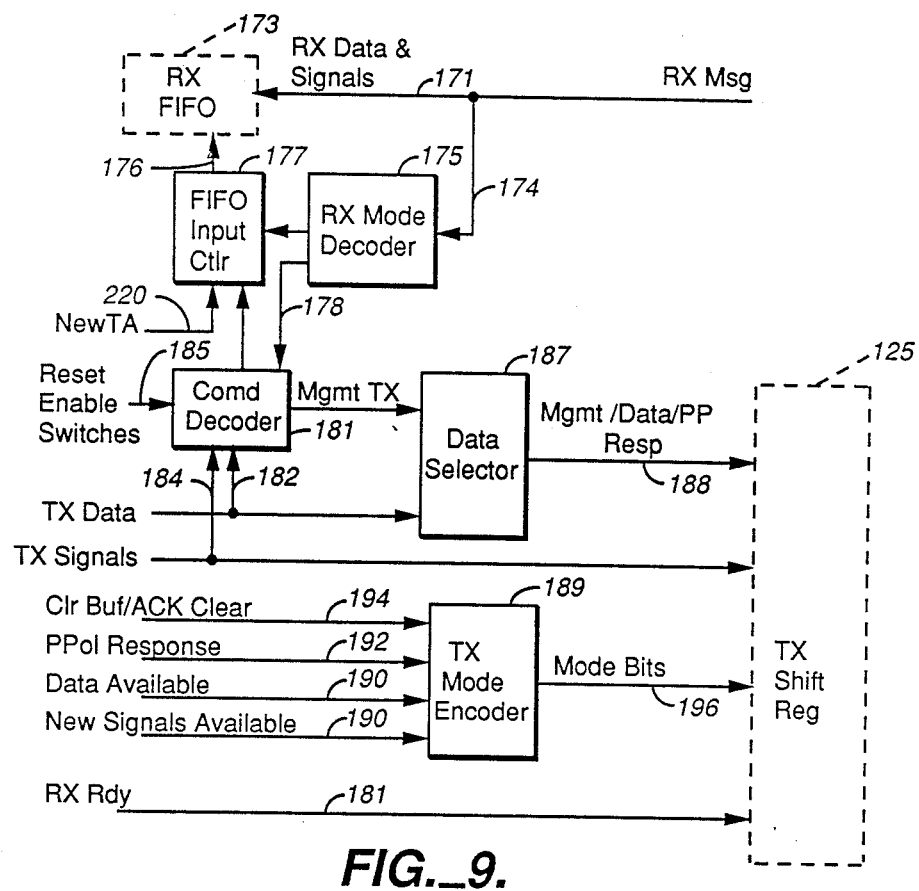
FIG._9.

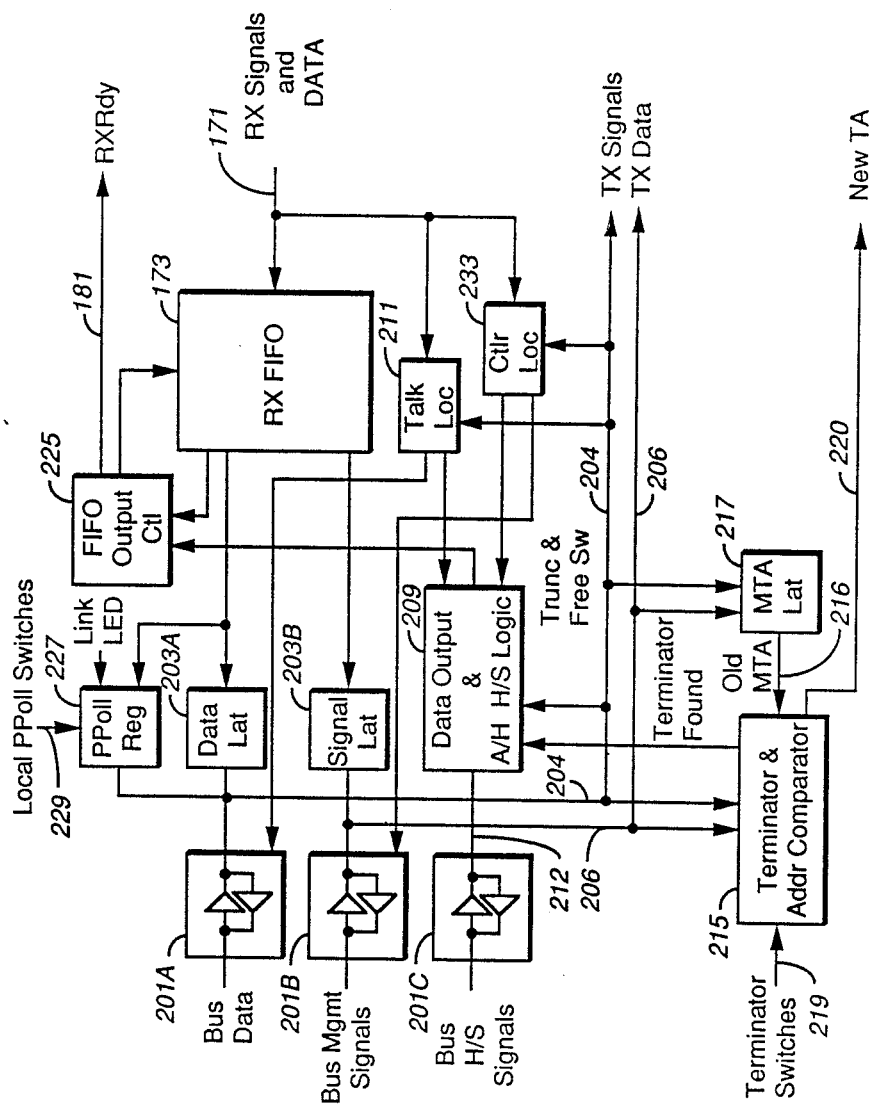
FIG._10.

DATA TRANSMISSION METHOD AND BUS EXTENDER

DESCRIPTION

1. Technical Field

The present invention relates to bus extenders which accept data from a parallel data bus and extend the bus by means of a serial link to another parallel bus, and in particular to bus extenders using fiberoptic or coaxial cables or other very high speed lines for the serial link.

2. Background Art

One of the best known parallel data bus standards is the IEEE-488. This standard is a precisely defined scheme that makes use of digital techniques to interconnect and automatically control electronic measuring instruments and other devices. As defined by the standard, the IEEE-488 bus is a cable of 24 wires consisting of 8 data lines, 5 management or control lines, 3 handshake or status lines and various ground and common lines. Data sent over the bus is handled eight bits at a time. That is, an 8-bit byte is the basic package of information. The bytes are sent over the bus one after the other. Thus, the data on the bus is referred to as being in a bit-parallel, byte-serial format.

One of the problems associated with parallel buses is that their length is limited by transmission characteristics of the individual wires, so that for transmissions of over tens of meters errors in the transferred bytes become apparent. Accordingly, each single IEEE-488 bus is limited by the standard to a maximum length of 20 meters. The standard also limits to fifteen the number of devices, including the controller, that can be attached to the bus. A basic IEEE-488 bus network with one controller and fourteen other devices on a bus is shown in FIG. 1.

Devices are available to overcome some of the limitations of the IEEE-488 bus standard. For example, bus expanders may be connected, as shown in FIG. 2, as one or more of the devices on a bus 11. Each such expander 13 acts like a repeater or relay to connect an additional fourteen devices 15 to bus 11 via a second bus 17. Thus, in the example shown, the number of devices on the network has been increased to twenty-seven. The additional devices 15 may be accessed by the controller using secondary addressing.

The present invention is another device, known as a bus extender, which overcomes the distance limitation of the IEEE-488 bus. Typically, bus extenders come in pairs connected as shown in FIG. 3. A local system bus 21 has a first extender 23 connected to it as one of the devices on the bus. A serial link 25, such as a dual twisted-pair cable, a full-duplex data link, a telephone line, a coaxial cable or a fiberoptic cable, extends from the first extender 23 to a second extender 27. The second extender communicates with remote devices via a remote system bus 29. In operation, each extender 23 and 27 reformats the data input into it. The sending extender converts the bit-parallel-formatted bus data into a bit-serial format and transmits it over the serial link in a fully serial mode. The receiving extender reconverts that data into the bit-parallel bus format and outputs it onto the bus.

Various bus extenders of the prior art that are available in the marketplace handle data reformatting and transport over the serial link in different ways. The HP 37203 bus extender sold by Hewlett-Packard Company uses a microprocessor to encode data and control signals into serial message frames and to decode them back into bit-parallel form. The message frames include an 8-bit handshake byte with bits for "data available", "ready for data", "data acknowledge", etc. and an 8-bit data byte. For a single transmission of data, with a wait for acknowledgment of error-free receipt, four message frames are required. Other bus extenders produced by National Instruments and other manufacturers also require handshaking each time a data byte is transferred. Propagation delays naturally present in the serial link coupled with the need to wait for acknowledgment of error-free transmission results in a data transfer speed which degrades with distance.

The ICS 4886 bus extender, sold by ICS Electronics Corporation, the assignee of the present invention, uses an asynchronous protocol which does not wait for an acknowledgment after every transmission. The sending extender assembles the command sequences and data messages into variable length blocks for transmission. To catch transmission errors, the sending extender also inserts vertical parity bits and longitudinal check sum characters into each block. The sum of a block is a function of the rate at which data on the bus is arriving at the extender and how fast the extender can put together a block. Only when a transmission error is detected by the receiving extender is a request for retransmission of the faulty block made. The transmitting extender stores the original message block in a buffer for a length of time that varies inversely with the baud rate and which is longer than the link turnaround time. Receipt of a request for retransmission causes the stored block to be transmitted. Because little handshaking is required, the data transfer rate is generally independent of the length of the serial link. The presence of the remote extender and data link integrity is continuously checked during the data transmission's idle times by means of serial polling between the two extenders.

It is desired to obtain even higher data transfer rates without a substantial increase in the error rate. Two serial links which are known to be capable of supporting very high speed data transfers are coaxial cables and fiberoptic cables. Fiberoptic cables have the additional advantages of being nondegrading, provide electrical isolation between local and remote sites from electromagnetic and radio frequency interference, and prevent signal radiation to outside detectors. In any fiberoptic or coaxial cable linked system it is desired that the data transfer rate be independent of cable length.

It is an object of the present invention to provide a method of transmitting data between pairs of bus extenders with a data transfer rate which is very fast and independent of the length of the serial link, and in which data link integrity is continuously checked.

DISCLOSURE OF THE INVENTION

The above object has been met with a data transmission method in which a pair of bus extenders sends a continuous train of message frames of fixed size along a dual serial link in both directions simultaneously. There is no handshaking between the pair of extenders unless a transmission error is detected. Upon detecting an error, the receiving extender sends, as part of one of its frames, a request for a retransmission beginning with the last good frame received.

Each message frame is a bit pattern of some fixed size having a predefined header, a tag number, a data section, and error checking bits. The header combined with the fixed size of each frame allows the receiving extender's decoder to generate an internal clock signal from the incoming stream of message frames, thereby providing for synchronous communication between the pair of extenders. The tag number identifies the type of information contained in the data section and is also used for establishing the link between extenders and requesting transmission or retransmission of message frames. The error bits are used to verify accurate transmission of a frame.

When a unit is powered up it attempts to establish the link to the other extender, by repeatedly sending a frame with a first tag number along the link. Both extenders search for this particular frame pattern, and when it is found, the extender that finds it changes its frame pattern to one having a second tag number, representing a request for data transmission. When this second frame pattern is received at the other extender, the serial link is ready for data transmission. All other tag numbers identify data frames. There are no gaps in the train of message frames. Each extender sends message frames continually to the other even though the stream of frames may contain nonsense, i.e. be empty. Thus, if no frames are incoming to an extender's receiver, then it is known that the serial link has been broken and must be reestablished.

Because there is no preconceived point where an acknowledgment needs to take place, very high speed is obtainable. Further, the data transfer rate is independent of the length of the serial link, because there is no waiting for a message to propagate down the link and an acknowledgment to return down the line. Data integrity is ensured by retransmitting when bad frames are detected. Because of the high transfer speed of the serial link compared to the bus controller and devices, and the fact that data bytes are introduced into message frames of fixed size as soon as they arrive from the parallel bus, no buffer is needed on the transmitting side of the extender, although a buffer is still needed on the receiving side. Other advantages will become apparent from the description of the best mode.

BRIEF DESCRIPTION OF THE DRAWINGS

FIG. 1 is a schematic block diagram of a parallel bus network of the prior art.

FIG. 2 is a schematic block diagram of a parallel bus network with a bus expander of the prior art.

FIG. 3 is a schematic block diagram of a parallel bus network with bus extenders generic to both he prior art and the present invention.

FIG. 4 is a simplified schematic diagram showing local and remote parallel buses linked by bus extenders organized in functional layers in accord with the present invention.

FIG. 5 is a functional block diagram of a bus extender of the present invention.

FIG. 6 is a timing diagram illustrating steps taken by the local bus extender of FIG. 5 in transporting a message to a remote bus.

FIG. 7 is a plan view of a format for a serial data message frame in accord with the present invention.

FIG. 8 is a functional block diagram of the transport layer of the bus extender of FIG. 4.

FIG. 9 is a functional block diagram of the management layer of the bus extender of FIG. 4.

FIG. 10 is a functional block diagram of the bus handshake layer of the bus extender of FIG. 4.

Best Mode for Carrying Out the Invention

With reference to FIGS. 3 and 4, like bus extenders of the prior art, the bus extenders of the present invention work in pairs 23 and 27 to extend an IEEE-488 or other parallel bus 21 beyond the 20 meter length limit. To extend the bus, the local bus extender 23 inputs a byte or character from local bus 21, serializes the bus data and status signals, and sends the serial message along a serial link 25 to a remote bus extender 27. The remote extender 27 receives the serial message, recreates the bus character, and places the reconstituted character onto a remote parallel bus 29.

The operation of a pair of bus extenders 23 and 27 is analogous to a multi-layer communication protocol. Each extender is organized into three broad functional layers, a bus handshake layer 31, a management layer 33 and a transport layer 35. The pair of extenders 23 and 27 are joined by the serial link 25 within the transport layer 35. This transport layer 35 is responsible for error-free transmission between the two extenders 23 and 27 via serial link 25. The management layer 33 has two functions. First, it receives and decodes the messages from the transport layer 35. Messages containing internal commands are acted upon, while those containing data and signals are passed onto the bus handshake layer 31 where they are stored until they can be placed on the bus. The second function is to assemble an output message for transmission by the transport layer 35. The handshake layer 31 provides an interface with the parallel bus in accordance with the IEEE-488 or other bus standard. The present invention differs from previous extenders principally in the transport and management layers. The functional layers, as they pertain to the present invention, are discussed in greater detail below with reference to FIGS. 8-10.

In the present invention, the extenders 23 and 27 are connected with a very high speed data link, such as coaxial and fiberoptic cables. Each extender's transport layer 35 contains drivers for either, or preferably both, of these cables, and the choice of cable type is irrelevant to the extenders' operation. The transport layer 35 of extenders in accord with the present invention continuously sends messages of fixed size at a very high rate (greater than 322,000 messages per second) and passes on all valid messages to the management layer. Any erroneous messages are discarded and a duplicate message is retransmitted to take its place. Maximum bus extension distance is achieved with the fiberoptic cable. Depending upon cable attenuation and transmitter power setting, the maximum extension distance will be in excess of two kilometers. The coaxial cable extension distance is limited to 500 meters due to signal degradation.

With reference to FIG. 5, bus handshake logic 43 inputs characters from an IEEE-488 bus 41. As defined by the IEEE-488 bus standard, characters comprise 8-bit data, 5 bus management or command signals and 3 bus handshake or status signals. A code recognition and control logic block 45 connected to bus handshake logic 43 checks each input character in case it is a command, such as "Take Control", that requires some special action by the extender. The inputted data and bus status signals are then passed along a line 46 to message check and control logic 47.

The message check and control logic 47 determines the content of the serial messages that are to be sent to the remote bus extender. Its choices are internal messages, bus data and status signals, changes in bus signals, and parallel polls. The selected information is formatted, as discussed below with reference to FIG. 7, and transferred via a line 48 to a serial output section 49. Serial output section 49 converts the formatted parallel message into serial form. The serialized message is passed via line 50 through a digital transmitter and receiver 51, which encodes a transmission clock with the data to produce a Manchester-encoded serial signal. This signal is routed on line 52 to the selected driver 53 and out onto the fiberoptic or coaxial extension cable 55a.

Encoded serial signals that are received from the extension cable 55b by an input buffer 57 is passed via line 58 through to the digital transmitter and receiver 51 where it is separated into received message and received clock. The serial message is checked for validity and then converted into parallel form by a serial input logic section 61 connected to digital transmitter and receiver 51 by line 60. Valid received messages are transferred on line 62 to the message check and control logic 47, which decodes the message.

If the decoded message contains either bus data or a signal change, it is put into a received storage buffer 65 connected by lines 64 and 66 between message check and control logic block 47 and bus handshake logic 43. The bus handshake logic 43 then outputs the received data and signals onto the bus 41, when allowed to by the IEEE-488 bus handshake rules. If, on the other hand, the decoded message requires some internal action, the message check and control logic 47 executes the command and does not place the message in the received storage buffer 65. If the received message is not valid, i.e. contains errors or is out of sequence, then the serial output section 49, which communicates with serial input section 61 via line 68, will request a retransmission, beginning with the invalid message frame.

One advantage of bus extenders of the present invention is their ability to transmit characters at very high speed over the serial extension, and to maintain that speed regardless of the distance between the extenders. Prior bus extenders relied upon receiving some kind of an acknowledgment or ready-for-data handshake from the remote extender for each bus character or signal change. That type of protocol always adds 2 to 4 times the bus extension delay time for the internal handshaking between each bus handshake. This has the effect of slowing the bus handshake down as the bus extension distance is increased. The present invention achieves full speed bus handshaking regardless of cable distance by continuously transmitting messages between the two extenders, regardless of whether there is any actual bus characters to transmit. The transport layer takes care of any erroneous or blank messages, and the logic in the bus handshake layer controls the data flow from the remote devices. The transport layer message rate is typically in excess of 322,000 messages per second for substantially error-free operation. At this speed, the fiberoptic error rate is typically less than one error in $10^9$ messages Higher rates can be achieved simply by using faster components, i.e. chips that use a higher clock speed. Depending upon the external device or bus controller handshake rate, the extenders can input bus characters at rates up to the transport layer message rate. If the extender has not inputted a character from the bus by the message send time, the management layer will send a blank, i.e. no-data message to the other extender.

With reference to FIG. 6, a first bus handshake 71 takes place and a character from the local bus is accepted by the extender's handshake layer. After a delay of about one microsecond, the management layer puts together a serial output message, indicated by time block 73. The transport layer then transmits a serial message 75 containing character information or data along the serial bus. After having received no character from the local bus, the management layer in time block 77 still assembles a serial output message and the transport layer transmits the message on schedule represented as a blank message frame 79. A second handshake 81 results in the assembly 83 and transmission of a data frame 85, while lack of a character on the bus during the next interval causes the management layer to assemble 87 and the transport layer to transmit a blank serial message 89. Arrival of messages at the remote extender result in hand-shakes 91 and 93 with the remote bus, whenever valid character information is received, and the information is placed on the remote bus. There is typically a lag of about 8 microseconds of lag time between a local bus handshake and the corresponding remote bus handshake. Message frames, either with data or empty, are assembled and transmitted every 3 microseconds.

With reference to FIG. 7, a typical format for a serial message frame is seen. A five bit header pattern 101 indicates the beginning of each message. A six bit tag number 103 identifies each message for retransmission. If a transmission error is detected by the receiving extender, it sends a request for transmission beginning with the last good message. Tag numbers 0 and 1 are reserved for initiating communication between extenders, as described below, so that in ordinary transmission the tag numbers cycle continuously between 2 and 31. The next 5 bits contain bus control signals 105, defined by the IEEE-488 standard. The next 3 bits contain handshake signals, including a ready bit 107 for bus-to-bus flow control and a two bit management mode 109. The management mode bits identify the type of message transmitted. For example, in order of priority, mode 3 may stand for an extender internal message, mode 0 may represent a parallel poll response, mode 1 may represent a bus character with signal status and mode 2 may represent bus signal changes. Following the management mode bits 109, 8 bits are provided for the bus data 111 and four CRC bits 113 are provided for error checking. Header 101, tag number 103 and error checking bits 113 are present in all messages.

When the extenders are first powered-up or reset, each extender attempts to establish the serial link to the other. Both extenders send out messages labeled with tag number 0 and search for like incoming messages. When that particular message is found by one of the extenders, it changes its message to one with tag number 1. When each extender has received messages with tag number 1, the link is considered to have been established.

With reference to FIG. 8, the transport layer of an extender of the present invention is responsible for error-free transmission and reception of messages between the bus extenders. Transmission (TX) of a serial message starts when a TX Counter 121 generates a "get message" signal on line 122 which tells the management layer to prepare the next outgoing message and load it into a TX shift register 125. Bus data and signals for transmission are shifted onto a line 126 and into a TX tag shift register 127. The serial output from the TX tag shift register 127 is saved via line 128 in a TX memory 129. TX memory 129 stores a copy of the last 30 messages, so that if a message were to be received incorrectly at the other end of the link, it can be retransmitted from the TX memory 129.

The serial output from the TX tag shift register 127 is also routed via line 132 through a TX encoder 133. The TX encoder 133 functions as a serial gate, assembling the message elements to make up the complete serial message. The TX counter 121 communicates with TX encoder 133 via five-bit bus line 134 and repeatedly counts out the bits of the message from 1 to 31. The TX encoder 133 generates the header bits during the first five counts. During counts 6 through 27, the "data" portion of the message is shifted out along line 132 from the TX tag shift register 127. TX tag shift register 127 includes a tag counter the output of which is the tag number portion of the message. The tag counter output also forms the higher order address bits for the TX memory 129. Alternatively, during retransmission, the data portion is shifted out of TX memory 129 along line 136. During counts 28 to 31, the TX encoder 133 generates the error checking bits that are appended to the end of the message. When a message is complete, the tag counter in TX shift register 127 is incremented. As soon as one message has been sent, another is started, thereby making message transmission a continuous process.

The serial message is routed along line 138 to a TX modulator portion 139 of a serial interface. Typically, the serial interface is an ETHERNET serial network chip manufactured by National Semiconductor which uses Manchester coding to transform the message signal to a form suitable for transmission on a line. The modulator 139 receives a clock signal from a 20 MHz oscillator 141 and combines the serial message with the clock signal to produce a Manchester encoded signal. The encoded output is routed along line 142 to a line driver circuit 143, which then passes the signal onto the link cable 144a. A digital switch may be used to route the signal to one of several available driver circuits 143, such as fiberoptic and coaxial cable drivers.

The receiver portion of the transport layer functions in reverse. Signals from the link cable 144b are received by a coaxial line receiver or optical detector 147 and passed through a receiver (RX) digital phase lock loop portion 149 of the serial interface chip to emerge as received data separated from a received clock signal. The received data is routed along line 150 to four major elements, an RX shift register 151, an RX counter 153, an error detector 155 and RX tag registers and comparator 157.

The RX Counter 153 detects the header, counts the received data bit times, and generates the bit number timing signals necessary to input the received message. The bit number timing signals are sent to the RX shift register 151, the error detector 155 and the RX tag registers 157. The RX shift register 151 shifts in the data portion of the received bits, i.e. message bits 12 to 27 from the serial interface. This includes all of the remote bus data and signal bits, plus mode and ready bits.

The error detector 155 inputs the received data bits, generates a check sum from the data and compares this with the received error check bits at the end of the message. Error detector 155 generates either an "OK" or "no good" signal, depending on the result of the error check, which is sent via a line 158 to an RX mode controller 159. The "no good" signal may also be sent to an error LED in a front panel of the extender to visually notify a user whenever an error is detected.

The RX tag counter, one of the RX tag registers 157, receives the tag number of the just received message from an RX tag shift register, also one of the register 157, and if the error detector and mode controller 159 indicate that this message is a good one, stores that tag number. Thus, the RX tag registers 157 keep track of the last good message received. Whenever an error is detected, the stored tag number is passed via mode controller 159, forming a retransmission request message, to a TX tag comparator 161. Similarly, when a retransmit request is received from a remote extender, the RX tag counter passes the tag number down to the TX tag comparator 161 to start retransmission from that point. The RX tag register 157 also includes an RX tag comparator, which compares the tag number in the RX tag shift register of the just received message with the expected tag number from the RX tag counter to verify that this is the wanted message. Note that had an error previously occurred and a retransmission request message been sent to the other extender, messages arriving on the link will be discarded until the requested one arrives.

The RX mode controller 159 receives error detector 155 and comparator 157 outputs from lines 158 and 162 and generates a valid message signal on line 164, which is sent to the management layer. The RX mode controller 159 also generates a link signal sent to an LED to indicate when the serial link is established. If the received message is incorrect, the RX mode controller 159 generates the retransmission request on line 166 and transfers the requested message number from the RX tag counter in register 157 through a latch to the tX tag comparator 161. In response, the TX tag comparator temporarily disables the TX tag shift register via TX controller 121 and causes the TX controller 121 to enable output from TX memory 129 to the TX encoder 133. TX tag comparator 161 communicates with TX controller 121 via a line 168. This transmission of stored messages from TX memory 129 continues until the TX tag comparator 161 finds that the tag number in the TX tag counter of TX shift register 127 matches the last message sent.

With reference to FIG. 9, the management layer receives and decodes messages from the transport layer. It also provides outgoing messages to the transport layer. Received message bits from the transport layer are routed on a line 171 to an RX FIFO stack memory 173 in the bus handshake layer. Received mode bits are routed on a branch line 174 to an RX mode decoder 175. If the received message holds bus data or signals (mode 1), a write enable pulse is generated on line 176 by a FIFO Input Controller 177 connected to the RX mode decoder 175. The input controller 177 enables the data and signals on line 171 to be written into the RX FIFO 173. Management messages, such as clear buffer acknowledgment, are then passed on line 178 to a command decoder 181 to reset the buffer clear flag. The management is then ready to receive the next message from the transport layer. The command controller 181 also sense commands on lines 182 and 184 from the local IEEE-488 bus that initiate a buffer clear sequence. The command decoder 181 can clear the local buffer on IFC, Device Clear and Selected Device Clear bus commands if enabled by internal reset enable switches 185.

Output data selection is performed by a data selector 187 receiving bus data from the handshake layer and internal management messages including parallel poll responses from the command controller. Selection is performed by gating the desired message on line 188 through to the TX shift register 125. A TX mode encoder 189 arbitrates the presence of new available bus data or signals 190, a parallel poll response byte 192 or a management message 194 to put the messages into the TX shift register 125 at the time the get message signal arrives from TX controller 121. At the same time, the TX mode controller 189 generates the message type code on the mode bit lines 196. The assembled message and the RX ready bit 181 is then loaded into the TX shift register 125. If there is no message ready to send at the 'get message' time, due to no bus activity or management changes since the last 'get message' time, the TX mode encoder 189 defaults to sending blank management messages.

With reference to FIG. 10, the bus handshake layer provides the IEEE-488 interface function; accepting or sourcing data, controlling devices and responding to parallel polls. Actual bus connection is provided by bus transceivers 201a–c. Incoming data and signals are sampled by latches 203a–b then transferred onto lines 204 and 206. The line 206 is monitored for any changes and a 'new signals available' signal on line 190 is generated whenever there is a change. If acceptor handshake control logic 209 connected to handshake transceiver 201c finds that handshake signal ATN is on, or if talk location logic 211, connected to receiver incoming data and signals from the management layer, indicates that the extender should input data from the bus, then the acceptor handshake control logic 209 generates an acceptor handshake on line 212 connected to transceiver 201c to input data from the bus.

A terminator and address comparator 215 checks each bus byte on lines 204 and 206 to see if it is an already selected terminator, a new talk address or a device clear command. The current talk address 216 is stored in terminator address latches 217. Terminator selection switches 219 on the extender's main board let the user select the terminators that will stop an acceptor handshake until a new talk address is received. Because a remote extender will recognize a terminator and stop a device from outputting more than one message when addressed to talk, the extenders do not have to lock both buses together to properly control a remote device. New talk addresses are sent from terminator and address comparator 215 on line 220 to the FIFO Input Controller 177 of the management layer.

A controller locator 223 keeps track of the system controller and controller-in-charge locations. The locator 223 senses the incoming bus signals on line 171 from the other extender at power turn-on or when reset First presence of an IFC or REN management signal establishes the system controller location. The ATN handshake signal establishes the controller-in-charge location. The controller-in-charge location is held until a 'take control' command is recognized, which resets the controller-in-charge location. The system controller location is fixed. Afterwards, the bus handshake layer either operates as a local end or "device" or a remote end or "bus controller". Characters from the local bus are accepted, checked for control functions and passed onto the management layer. Data stored in the RX FIFO 173 is put on the bus as soon as possible. The controller locator 223 outputs control handshake signals IFC, REN and ATN to the bus handshake signal transceiver 201c.

The talker locator 211 helps to determine whether the extender should output data from the RX FIFO 173 or input data from a local bus controller or device by outputting the talk command to data output logic 209. The data output logic 209 uses the controller-in-charge flag from the controller locator 223 to determine the extender's role, output data and commands as the remote bus controller or outputting responses from the remote devices to the bus controller. At the remote end, if the extender is the controller-in-charge, then it outputs commands and data whenever they are received. At the local end, if the extender is not the controller-in-charge, it outputs the device responses when a talk address from talker locator 211 has been put on the bus and data is present in the RX FIFO 173. Data output is controlled by a FIFO output controller 225 connected between the RX FIFO 173 and the data output and acceptor handshake logic 209.

A parallel poll register 227 provides the local parallel poll response to the bus controller. At the start of a parallel poll, signals ATN and EOI are true and the talker locator 211 generates a poll enable signal which causes parallel poll register 227 to immediately output a response onto the outgoing data bus. When the local extender receives the parallel poll response from the remote extender, the new response is stored in the register 227 and the local bus output is automatically updated. If the local extender is enabled to respond to a parallel poll by one of the switches 229, other switches 229 establish the response bit location. If enabled, the parallel poll register 227 logically ORs the link status bit into the remote response during the parallel poll time.

The above described extender provides a continuous transmission of messages along a serial link so as to yield a very fast data transfer rate. For the sake of commercial economy in parts, the current extender operates at rates up to 322,000 bytes per second but can be easily increased to a rate well above the parallel bus rate. The extender also maintains this speed independent of the serial link's length, because handshaking between extenders occurs only if a data error occurs and this handshaking is limited to a retransmission request beginning with the last good message. Data link integrity is continuously checked by the presence of an incoming error-free signal from the remote extender.

We claim:

1. A method of transmitting data and signals from a parallel bus comprising,
   (a) receiving data and signals from a local parallel bus as they arrive at a local bus extender,
   (b) continuously constructing serial messages of fixed size for transmission over a serial extender link, said messages including a tag number, mode bits representing the type of message, error checking bits and, whenever available, said data and signals, "blank" messages being constructed without data and signals whenever said data and signals are not available,
   (c) continuously sending said constructed serial messages over a serial link to a remote bus extender,
   (d) receiving said serial messages from said serial link at said remote bus extender, said received serial message being checked for an expected tag number and error checking bits corresponding to a valid errorfree message, said data and signals, whenever present, being buffered for transmission over a remote parallel bus, and (e) loading said data and signals of said valid error-free messages onto said remote parallel bus, wherein, a "request for retransmission" message frame identifying the last error-free message is sent over said serial link from said remote extender to said local extender only when an error in said received serial message, said expected tag number corresponding to said last error-free message.

2. The method of claim 1 further comprising establishing said serial link between said local and remote extenders, said link being established by sending from each extender along said serial link a message frame with a first predetermined tag number, and sending a message frame with a second predetermined tag number from one of said extenders when a message frame is received on said serial link with said first predetermined tag number, said link being considered established when a message frame with said second predetermined tag number is received by one of said extenders.

3. The method of claim 1 wherein said constructed serial messages are encoded with clock pulses.

4. The method of claim 1 wherein sending said serial messages comprises producing encoded light signals for transmission over a fiberoptic line, receiving said serial messages comprising optically detecting said light signals on said fiberoptic line.

5. The method of claim 1 wherein sending said serial messages comprises electrically driving a coaxial cable.

6. The method of claim 1 wherein said types of messages include inter-extender command messages and parallel poll responses, said received serial message being acted upon by said remote extender whenever said message type is an inter-extender command message or a parallel poll response.

7. A bus extender comprising, handshake means connectable to a parallel bus for receiving and sending data and signals on said bus, transmitter and receiver means connectable to a serial link for sending and receiving serial messages on said link, at least some of said serial messages corresponding to data and signals on said bus, first means connected between said handshake means and said transmitter and receiver means for continuously constructing serial messages, said serial messages including a tag number, mode bits representing a message type, error checking bits, and, wherever available from said handshake means, said data and signals, said first means constructing blank messages without said data and signals whenever said data and signals are unavailable, memory means communicating with said first means for storing a predetermined number of said tag numbers, and corresponding mode bits and data and signals, second means connected between said transmitter and receiver means and said handshake means for continuously receiving and decoding said serial messages from said link, said second means including means for checking said tag number and said error checking bits for a valid error-free message, data and signals corresponding to valid error-free messages being stored in a stack memory of said handshake means, and retransmission control means connected between said first and second means for directing said first means to construct a serial message with mode bits corresponding to a retransmission request and with bits corresponding to the tag number of the last error-free message received, whenever an error is detected by said second means, and for directing said first means to construct serial messages from said memory means beginning with the tag number of the last error-free message, whenever a retransmission request is received by said second means.

8. The extender of claim 7 wherein said first means comprises, means connected to said handshake means and to said second means for selecting between any available data and signals, a response to a received inter-extender command, a parallel poll, or a blank message and for determining said message type, said means outputting said selected information and mode bits corresponding to said message type, a shift register connected to said selecting and determining means for shifting in said selected information and said mode bits, means connected to said shift register and to said memory means for assembling a message header, a tag number, said mode bits and information from either of said shift register or said memory means, and error checking bits into a message, said retransmission control means determining which of said sources of mode bits and information is used in said message, and counter means connected to said means for assembling, whereby said means for assembling continuously constructs serial messages, said means for assembling connected to output said message to said transmitter and receiver means.

9. The extender of claim 8 wherein said retransmission control means includes a tag counter responsive to sets of mode and information bits from said shift register, and tag comparator means for comparing a tag number of a retransmission request with a tag number stored in said tag counter, said retransmission control means directing said means for assembling to use said memory means whenever said tag number of a retransmission request is not equal to said tag number in said tag counter.

10. The extender of claim 7 wherein said serial link is a fiberoptic link.

11. The extender of claim 7 wherein said serial link is a coaxial cable link.

* * * * *